US010627990B2

United States Patent
Suzuki

(10) Patent No.: US 10,627,990 B2
(45) Date of Patent: Apr. 21, 2020

(54) MAP INFORMATION DISPLAY DEVICE, MAP INFORMATION DISPLAY METHOD, AND MAP INFORMATION DISPLAY PROGRAM

(71) Applicant: NTT DOCOMO, INC., Chiyoda-ku (JP)

(72) Inventor: Takashi Suzuki, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 680 days.

(21) Appl. No.: 14/915,787

(22) PCT Filed: Aug. 13, 2014

(86) PCT No.: PCT/JP2014/071403
§ 371 (c)(1),
(2) Date: Mar. 1, 2016

(87) PCT Pub. No.: WO2015/037389
PCT Pub. Date: Mar. 19, 2015

(65) Prior Publication Data
US 2016/0283054 A1    Sep. 29, 2016

(30) Foreign Application Priority Data
Sep. 13, 2013    (JP) ................... 2013-191047

(51) Int. Cl.
*G06F 3/0482*    (2013.01)
*G09B 29/10*    (2006.01)
(Continued)

(52) U.S. Cl.
CPC .......... *G06F 3/0482* (2013.01); *G06F 3/0488* (2013.01); *G06F 3/04845* (2013.01);
(Continued)

(58) Field of Classification Search
CPC ............... G06F 3/0482; G06F 3/04883; G06F 3/04845; G06F 17/30241; G06F 3/0488; G09B 29/007; G09B 29/10
See application file for complete search history.

(56) References Cited

U.S. PATENT DOCUMENTS 8,402,391 B1 *  3/2013  Doray ................... G06F 3/0482
                                                715/834
8,464,181 B1 *  6/2013  Bailiang ............. G06F 3/04815
                                                715/848
(Continued)

FOREIGN PATENT DOCUMENTS

JP    2005-83941 A    3/2005
JP    2010-181447 A    8/2010
(Continued)

OTHER PUBLICATIONS

English translation of the International Preliminary Report on Patentability and Written Opinion of the International Searching Authority dated Mar. 24, 2016 in PCT/JP2014/071403.
(Continued)

*Primary Examiner* — Amy M Levy
(74) *Attorney, Agent, or Firm* — Oblon, McClelland, Maier & Neustadt, L.L.P.

(57) ABSTRACT

A map information display device includes a touch panel that displays map information and receives a user's touch operation, a touch position detection unit that detects a touch position on the touch panel, a building determination unit that determines whether there is a building whose inside information is displayable in the map information displayed on the touch panel, and a floor selection menu display processing unit that displays a floor selection menu having selection items corresponding to displayable floors in close proximity to the touch position on the touch panel when the
(Continued)

building determination unit determines that there is a building whose inside information is displayable.

11 Claims, 13 Drawing Sheets

(51) Int. Cl.
*G06F 3/0488* (2013.01)
*G09B 29/00* (2006.01)
*G06F 16/29* (2019.01)
*G06F 3/0484* (2013.01)

(52) U.S. Cl.
CPC .......... *G06F 3/04883* (2013.01); *G06F 16/29* (2019.01); *G09B 29/007* (2013.01); *G09B 29/10* (2013.01)

(56) References Cited

U.S. PATENT DOCUMENTS

| | | | | |
|---|---|---|---|---|
| 8,812,995 | B1* | 8/2014 | Murphy | G06F 3/0488 |
| | | | | 715/863 |
| 9,250,797 | B2* | 2/2016 | Roberts | G06F 3/04883 |
| 2004/0221243 | A1* | 11/2004 | Twerdahl | G06F 3/016 |
| | | | | 715/834 |
| 2005/0051623 | A1 | 3/2005 | Okuda et al. | |
| 2009/0085878 | A1 | 4/2009 | Heubel et al. | |
| 2013/0132042 | A1* | 5/2013 | Chan | G06F 17/50 |
| | | | | 703/1ke |
| 2014/0245232 | A1* | 8/2014 | Bailiang | G06F 3/04815 |
| | | | | 715/850 |

FOREIGN PATENT DOCUMENTS

| | | |
|---|---|---|
| JP | 2013-96777 A | 5/2013 |
| WO | WO 2006/020305 A2 | 2/2006 |
| WO | WO 2013/016414 A1 | 1/2013 |
| WO | 2013/161416 A1 | 10/2013 |

OTHER PUBLICATIONS

Office Action dated Apr. 5, 2016 in Japanese Patent Application No. 2013-191047 (with English translation).

European Office Action dated Jul. 3, 2017 in Patent Application No. 14 843 375.8.

Extended European Search Report dated Jul. 13, 2016 in Patent Application No. 14843375.8.

Office Action dated Apr. 3, 2018 in European Patent Application No. 14843375.8, 9 pages.

Taiga Aoki, "'Google Maps for Android' provides maps in buildings at main stations and department stores in Tokyo," Impress Corp., Internet Watch, entire text <URL: http://internet.watch.impress.co.jp/docs/news/20111130_494360.html>, Nov. 30, 2011 (with English translation) (5 pages).

International Search Report dated Nov. 11, 2014 in PCT/JP2014/071403 filed Aug. 13, 2014.

Japanese Office Action dated Oct. 25, 2016 in Patent Application No. 2013-191047 (with English Translation).

* cited by examiner

Fig.4

| BUILDING NAME | LATITUDE, LONGITUDE | FLOOR DISPLAY | FLOOR NUMBER INFORMATION | | MAP DATA NUMBER |
|---|---|---|---|---|---|
| | | | UPPER GROUND FLOOR | LOWER GROUND FLOOR | |
| BUILDING A | aaa.bbb | AVAILABLE | 1F,2F,3F | — | 1 |
| BUILDING B | ccc.ddd | UNAVAILABLE | — | — | — |
| BUILDING C | eee.fff | AVAILABLE | 1F | B1,B2 | 3 |
| ... | ... | ... | ... | ... | ... |

MAP INFORMATION DISPLAY DEVICE, MAP INFORMATION DISPLAY METHOD, AND MAP INFORMATION DISPLAY PROGRAM

TECHNICAL FIELD

The present invention relates to a map information display device, a map information display method, and a map information display program that display map information of each floor in a building.

BACKGROUND ART

As a map application that displays a map on a touch panel such as a smartphone or a tablet, the map application disclosed in Non Patent Literature 1 below, for example, is known. According to this map application, map operations such as scroll, zoom in/out and rotation of map display can be generally performed by multi-touch. The multi-touch is an operation with fingers or the like touching a plurality of positions on a touch panel at one time.

For example, when the above-described map application detects a drag of a finger or the like on a touch panel, it moves the position of map display on a screen. Further, when the map application detects a pinch-out, it displays a map in an enlarged scale. The pinch-out is an operation of moving two fingers touching different positions on a touch panel to increase the gap between the two fingers. Further, when the map application detects a pinch-in, it displays a map in a reduced scale. The pinch-in is an operation of moving two fingers touching different positions on a touch panel to decrease the gap between the two fingers. Furthermore, when the map application detects an operation of moving two fingers touching different positions on a touch panel in a circular motion in the same rotating direction, it rotates map display. The pinch-in (or pinch-out) and the rotation can be done at the same time.

Further, the above-described map application provides a user with a function of displaying the inside of a building for each floor. To be specific, as shown in FIG. 13, when a building whose inside information is displayable is displayed on a screen (touch panel), the map application displays a floor selection bar X where a plurality of floor numbers are vertically displayed, for example, as a menu for floor selection operation at a predetermined position on the right side of a screen. Then, when the map application detects that a selection item ("3", "B1" etc.) in the floor selection bar X is tapped, it switches a map that is displayed on the screen. For example, when "3", which is one of selection items in the floor selection bar X, is tapped, the map application switches the map information of the corresponding part of the building that is displayed on the screen to the map information of the third floor of the building. In this manner, in the map application, a user can refer to the map information of the floor which the user desires to know inside the building by tapping the floor number displayed on the menu for floor selection operation.

CITATION LIST

Non Patent Literature

NPL1: Google, "Google map", online Internet <URL: https://maps.google.co.jp/>

SUMMARY OF INVENTION

Technical Problem

However, in the above-described map application, a user needs to perform two steps of operations, releasing the finger from the screen and then tapping the floor number display part on the floor selection bar X, to switch a floor to be displayed as a map. Specifically, a user cannot seamlessly perform the operation of switching a floor to be displayed as a map with the map operation such as move, zoom in/out or rotation. In this manner, in the map application, it takes time and effort for a user to perform the operation for switching a floor to be displayed as a map.

The present invention has been accomplished to solve the above problems and an object of the present invention is thus to provide a map information display device, a map information display method, and a map information display program capable of improving the ease of operation for referring to inside information of a building.

Solution to Problem

A map information display device according to one aspect of the present invention includes an input receiving means configured to display map information and receive a user's input operation, an input position detection means configured to detect an input position on the input receiving means, a building determination means configured to determine whether there is a building whose inside information is displayable in the map information displayed on the input receiving means, and a floor selection menu display processing means configured to display a floor selection menu having selection items corresponding to displayable floors in close proximity to the input position on the input receiving means when the building determination means determines that there is a building whose inside information is displayable.

A map information display method according to one aspect of the present invention includes an input position detection step of detecting an input position on an input receiving means, a building determination step of determining whether there is a building whose inside information is displayable in map information displayed on the input receiving means, and a floor selection menu display processing step of displaying a floor selection menu having selection items corresponding to displayable floors in close proximity to the input position on the input receiving means when it is determined in the building determination step that there is a building whose inside information is displayable.

A map information display program according to one aspect of the present invention causes a computer with an input receiving means configured to display map information and receive a user's input operation to function as an input position detection means configured to detect an input position on the input receiving means, a building determination means configured to determine whether there is a building whose inside information is displayable in the map information displayed on the input receiving means, and a floor selection menu display processing means configured to display a floor selection menu having selection items corresponding to displayable floors in close proximity to the input position on the input receiving means when the building determination means determines that there is a building whose inside information is displayable.

In the above aspects, when there is a building whose inside information is displayable in the map information displayed on the input receiving means, a floor selection menu having selection items corresponding to displayable floors is displayed in close proximity to the input position on the input receiving means. It is thereby possible to perform the map operation such as scroll, zoom in/out or rotation of map display and further perform the floor selection operation that selects a floor to be displayed as a map from the floor selection menu smoothly. In other words, a user can seamlessly perform the map operation and the floor selection operation as described above. For example, when the input receiving means is a touch panel that receives a touch operation, a user can perform the map operation and further perform the floor selection operation easily by slightly moving the finger from the touch position (input position) to the floor selection menu. It is thereby possible to improve the ease of the floor selection operation for referring to the inside information of the building.

In the above-described map information display device, the floor selection menu display processing means may display a menu where the selection items are arranged in a circumferential direction centering on the input position as the floor selection menu. Because all selection items are placed at an equal distance from the input position in the floor selection menu, a user can select a desired floor with the same operation load when selecting any floor. For example, when the input receiving means is a touch panel that receives a touch operation, a user can perform the floor selection operation by slightly moving the finger at the same distance from the touch position (input position). It is thus possible to further improve the ease of the floor selection operation.

In the above-described map information display device, the floor selection menu display processing means may move a display position of the floor selection menu in conjunction with movement of the input position. Thus, when the input position moves by the map operation such as scroll, zoom in/out or rotation of map display, for example, the floor selection menu moves in conjunction with the movement of the input position, and therefore the floor selection menu is always displayed in close proximity to the input position. A user can thereby perform the floor selection operation easily even when the input position moves by the map operation or the like.

In the above-described map information display device, the floor selection menu display processing means may display the floor selection menu on a side of the building whose inside information is displayable with respect to the input position. In this aspect, because it is possible to visually grasp the position of the building for which the floor selection menu is operated by the display position of the floor selection menu, and it is possible to improve the case of the floor selection operation.

In the above-described map information display device, when there are a plurality of buildings whose inside information is displayable in the map information displayed on the input receiving means, the floor selection menu display processing means may display the floor selection menu corresponding to each of the plurality of buildings. Thus, even when there are a plurality of buildings where inside information can be displayed, it is possible to display only the inside information of the desired building by operating the floor selection menu corresponding to each building, and it is thereby possible to improve the convenience of a user who refers to the map information.

In the above-described map information display device, the floor selection menu display processing means may increase or decrease a display size of the floor selection menu in conjunction with zoom in or out of the map information displayed on the input receiving means. It is generally assumed that a user desires to refer to the inside information of a building more often when zooming out the map information to refer to large-scale map information than when zooming in the map information to refer to small-scale map information. Therefore, according to the above-described map information display device, when it is likely that the floor selection operation is performed because the map information is zoomed in, the floor selection menu is displayed in a large scale to be more visible, and it is thereby possible to further improve the ease of the floor selection operation. On the other hand, when it is unlikely that the floor selection operation is performed because the map information is zoomed out, the floor selection menu is displayed in a small scale to be less visible, and it is thereby possible to further improve the convenience of a user referring to the map information.

In the above-described map information display device, the input position detection means may detect a first input position and a second input position as the input position, and the floor selection menu display processing means may display a first floor selection menu in close proximity to the first input position and display a second floor selection menu in close proximity to the second input position, and display selection items corresponding to floors of equal to or higher than a reference floor determined based on a predetermined criterion as selection items of the first floor selection menu and display selection items corresponding to floors of lower than the reference floor as selection items of the second floor selection menu. In this manner, because the floor selection menu is displayed at two positions, a large number of selection items can be displayed at a time, and it is thereby possible to improve the ease of the floor selection operation. Further, because the selection items that are displayed in one floor selection menu (first floor selection menu) and the other floor selection menu (second floor selection menu) are clearly distinguished based on a predetermined criterion, a user can easily determine which floor selection menu is to be operated in accordance with the floor number which the user desires to display as a map.

In the above-described map information display device, the floor selection menu display processing means may display the first floor selection menu on an opposite side to the second input position with respect to the first input position and display the second floor selection menu on an opposite side to the first input position with respect to the second input position. For example, when the input receiving means is a touch panel that receives a touch operation, a user generally touches two positions on the touch panel with the thumb and the forefinger. Specifically, the space between the first input position and the second input position on the touch panel is hidden behind the user's hand and difficult to see. Therefore, according to the above-described map information display device, because the floor selection menu is displayed at a position where a user can easily see, it is possible to improve the ease of the floor selection operation.

The above-described map information display device may further include an input operation determination means configured to determine, based on a moving speed and a moving direction of an input position detected by the input position detection means for a series of user's touch operations on the input receiving means, whether the user's touch operation is a map operation that changes the map information displayed on the input receiving means or a floor selection operation that selects a floor from the floor selection menu. A user can thereby easily switch the map operation and the floor selection operation by changing the moving speed and the moving direction of the input operation. For example, when the input receiving means is a touch panel that receives a touch operation, a user can perform the map operation and the floor selection operation seamlessly without need for two steps of input operations: releasing the finger from the touch panel and then touching a predetermined position on the touch panel again.

In the above-described map information display device, the input position detection means may detect a first input position and a second input position as the input position, the floor selection menu display processing means may display a first floor selection menu in close proximity to the first input position and display a second floor selection menu in close proximity to the second input position, and during a period when the floor selection operation on the first floor selection menu or the second floor selection menu is performed by movement of the first input position or the second input position, the input operation determination means may recognize a center of a display position of the floor selection menu where the floor selection operation is performed as one input position and further determine that an operation of moving the input position where the floor selection operation is not performed as the map operation. Thus, during performing the floor selection operation on one floor selection menu, it is possible to perform the map operation such as zoom in/out and rotation, for example, by moving the input position on the side of the other floor selection menu. Specifically, because the map operation and the floor selection operation can be performed at the same time, it is possible to improve the convenience of a user.

Advantageous Effects of Invention

According to the present invention, it is possible to improve the ease of operation for referring to inside information of a building.

BRIEF DESCRIPTION OF DRAWINGS

FIG. 4 is a view showing one example of building information.

DESCRIPTION OF EMBODIMENTS

Figure 1:
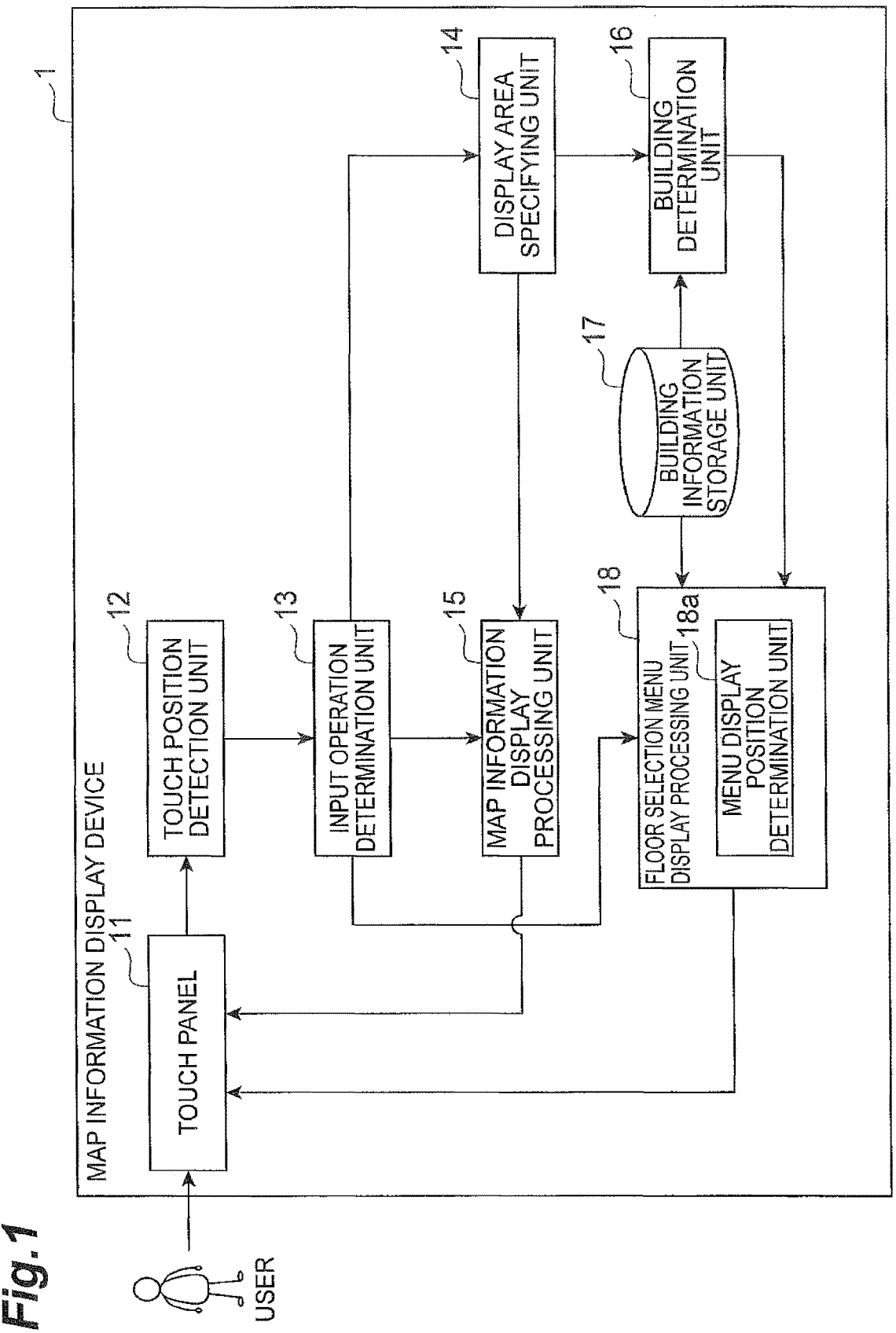
FIG. 1 is a block diagram showing a functional configuration of a map information display device according to one embodiment of the present invention.

Embodiments of the present invention are described hereinafter with reference to the drawings. Note that, where possible, the same elements are denoted by the same reference numerals and redundant description thereof is omitted.

FIG. 1 is a block diagram showing a functional configuration of a map information display device 1 according to one embodiment of the present invention. The map information display device 1 is a device that provides a user with map information. To be specific, the map information display device 1 is a device with a touch panel (input receiving means) 11 that displays map information and receives a user's touch operation (input operation), and it is a terminal device such as a smartphone or a tablet, for example. Note that, however, the map information display device 1 is not limited to those devices as long as it can display map information and receive a user's input operation.

The map information display device 1 provides a user with a function that displays map information on the touch panel 11 and, when there is a building whose floor map is displayable within the map information, further displays, superimposed on the map information, a floor selection menu for selecting a floor map to be displayed, so that the user can refer to the floor map of each floor in the building (inside information of the building). To achieve such a function, the map information display device 1 includes the touch panel 11, a touch position detection unit 12, an input operation determination unit 13, a display area specifying unit 14, a map information display processing unit 15, a building determination unit 16, a building information storage unit 17, and a floor selection menu display processing unit 18 as shown in FIG. 1.

Figure 2:
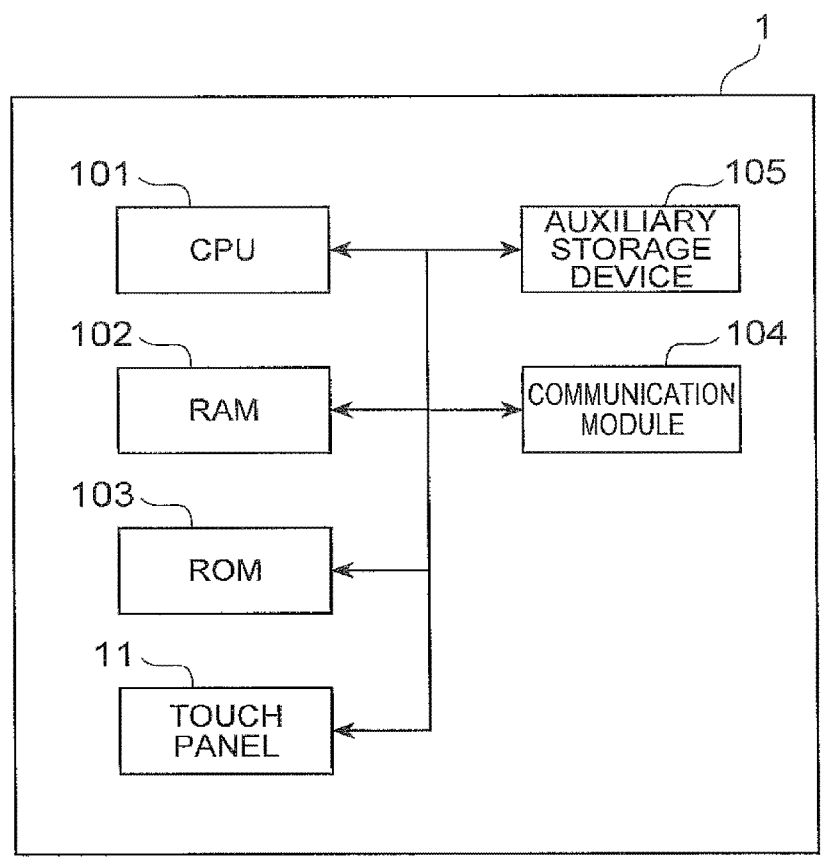
FIG. 2 is a block diagram showing a hardware configuration of the map information display device.

FIG. 2 is a block diagram showing a hardware configuration of the map information display device 1. As shown in FIG. 2, the map information display device 1 shown in FIG. 1 is physically configured as a computer system that includes one or a plurality of CPU 101, a RAM 102 and a ROM 103 which are a main storage device, a touch panel 11, a communication module 104 which is a data transmitting and receiving device such as a network card, an auxiliary storage device 105 such as a hard disk or a semiconductor memory and the like.

The functions of the map information display device 1 are implemented by loading given computer software onto hardware such as the CPU 101 or the RAM 102 shown in FIG. 2, making the touch panel 11 operate as an input device and an output device and making the communication module 104 operate under control of the CPU 101, and performing reading and writing of data in the RAM 102 and the auxiliary storage device 105. Note that a software configuration for implementing the functions of the map information display device 1 is not particularly limited. For example, the functions of the map information display device 1 may be implemented as one function of OS (operating system) that is loaded to the RAM 102 and runs from it or may be implemented as a function of application software (map application) that runs on OS. This embodiment is described based on the assumption that the functions of the map information display device 1 are implemented as a map application that runs on OS. In the case where it is implemented as one function of OS, the term "map application" in the following description is replaced with "one function of OS". Each of the functional blocks shown in FIG. 1 is described hereinafter.

The touch panel 11 displays map information and receives a user's touch operation as described above. For example, when a user starts up a map application, map information is displayed on the touch panel 11. The displayed map information may be map information of an area that is set to be displayed by default at the startup of the map application or may be map information that is displayed lastly when the map application is used last time. Note that the map information (including a floor map) to be displayed on the touch panel 11 may be stored in a place which the map application can refer to. For example, the map information may be stored in the ROM 103 or the like or may be stored in a server device or the like other than the map information display device 1, which is accessible through the communication module 104.

A user refers to the map information displayed on the touch panel 11 and performs a predetermined touch operation with a finger or the like on the touch panel 11, thereby performing a map operation, a floor selection operation or the like, which are described later. To be specific, detection of a touch position (input position), determination of a touch operation, display processing and the like are implemented by the functional elements described later.

The touch position detection unit 12 is an input position detection means of detecting a touch position on the touch panel 11. For example, the position on the touch panel 11 is uniquely identified by the xy coordinates defined by the x-axis and the y-axis orthogonal to each other. In this case, the touch position detection unit 12 detects the xy coordinates of a point at which a user is touching the touch panel 11 with a finger or the like as the touch position on the touch panel 11. The touch position detection unit 12 detects the touch position at regular intervals and stores information about the detected touch position (xy coordinates) for a predetermined period of time as history information into the RAM 102 or the like.

Figure 3:
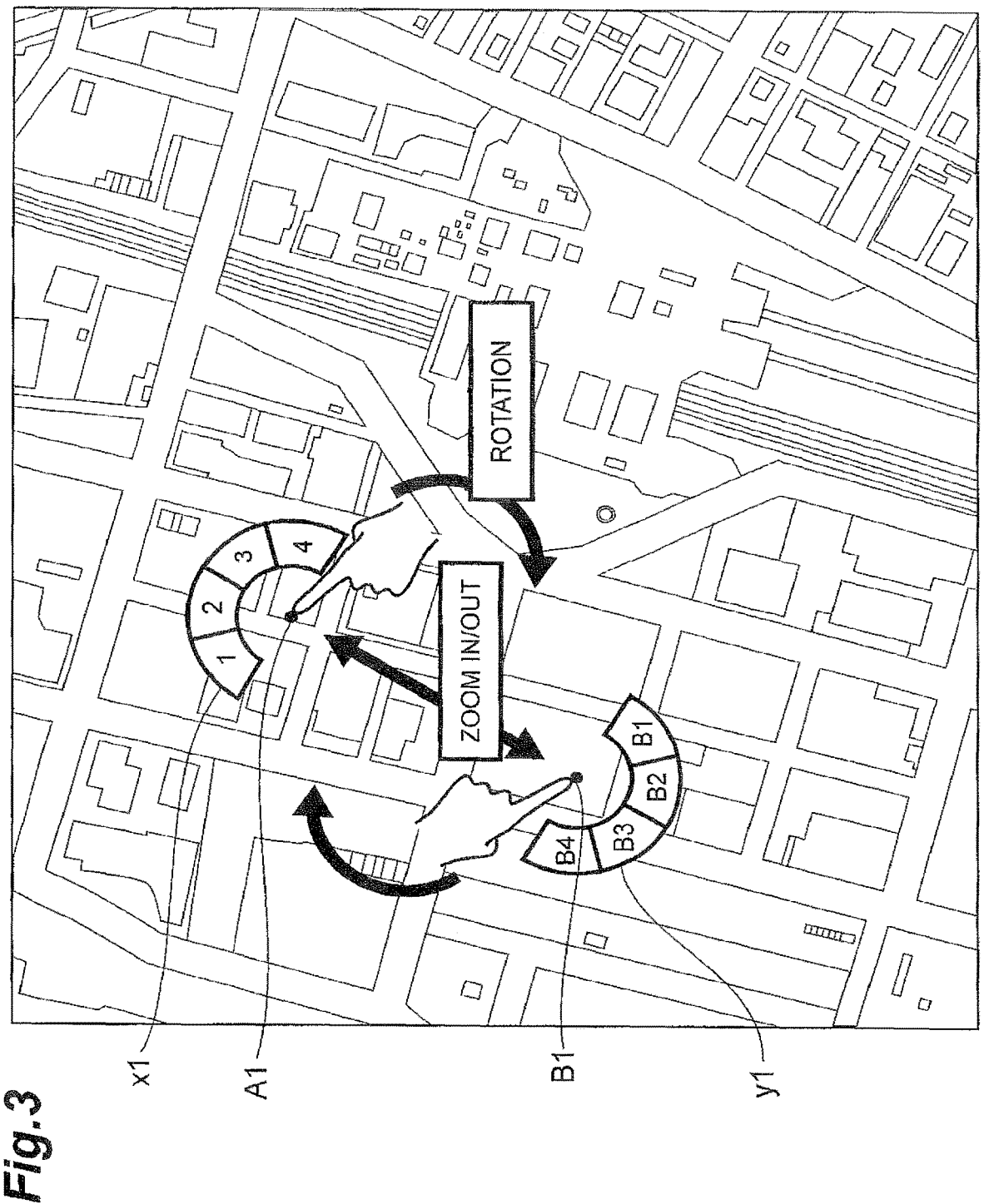
FIG. 3 is a view showing one example of display containing a floor selection menu.

The touch position detection unit 12 can detect at least two (which is two as one example in this embodiment) touch positions where the touch panel 11 is touched at the same time as different touch positions. FIG. 3 is a view showing one example of display containing a floor selection menu on the touch panel 11. As shown in FIG. 3, the floor selection menu includes selection items ("1" to "4" and "B1" to "B4") corresponding to floor numbers where a floor map is displayable. Now, consider the case where a user performs a multi-touch operation that touches a touch position A1 with any finger and touches a touch position B1 with a finger different from the finger touching the touch position A1. In this case, the touch position detection unit 12 detects, out of the two touch positions, the touch position A1 placed on the upper side of the map display on the touch panel 11 as a first input position and detects the other touch position B1 as a second input position, and stores a predetermined period of history information of each touch position into the RAM 102 or the like.

The input operation determination unit 13 is an input operation determination means of determining the operation type of a user's touch operation based on the moving speed and the moving direction of the touch position detected by the touch position detection unit 12 for a series of user's touch operations on the touch panel 11. To be specific, the input operation determination unit 13 detects the moving speed and the moving direction of the touch position based on the history information of the touch position detected by the touch position detection unit 12 and stored in the RAM 102 or the like, and determines the operation type of a user's touch operation based on the moving speed and the moving direction of the touch position. The operation type includes a map operation and a floor selection operation.

The map operation is an operation that changes (for example, scrolls, zooms in/out, rotates etc.) the map information displayed on the touch panel 11. For example, the input operation determination unit 13 previously stores pattern information of the moving amount and the moving direction of the touch position corresponding to those map operations, and determines to which map operation the touch operation corresponds by determining the degree of matching with the pattern information. For example, the input operation determination unit 13 determines a drag operation on the touch panel 11 as scroll of the map information. Further, as shown in FIG. 3, the input operation determination unit 13 determines the operation of increasing the gap between the two touch positions A1 and B1 on the touch panel 11 (pinch-out operation) as zoom-in, and determines the operation of decreasing the gap between the two touch positions A1 and B1 on the touch panel 11 (pinch-in operation) as zoom-out. Further, the input operation determination unit 13 determines the operation of moving the touch positions A1 and B1 in a circular motion in the same rotating direction as rotation, for example.

The floor selection operation is an operation that selects, from the floor selection menu, a floor number of a floor map to be displayed about a part of a building where the floor map of each floor in the building is displayable. Note that the details of processing that determines whether a touch operation is the floor selection operation or not are described later.

When the input operation determination unit 13 determines that a user's touch operation is the map operation, it outputs map operation information indicating the content of the map operation to the display area specifying unit 14. The map operation information is information for uniquely identifying the content of the map operation such as the operation type like scroll of the map, zoom in/out or rotation, the moving amount of the touch operation, and the moving direction of the touch operation.

On the other hand, when the input operation determination unit 13 determines that a user's touch operation is the floor selection operation, it outputs floor selection operation information indicating the content of the floor selection operation to the map information display processing unit 15 and the floor selection menu display processing unit 18. The floor selection operation information includes operation target information indicating a building for which a floor selection menu is operated and selection item information indicating a selection item selected by the user.

The display area specifying unit 14 is a means of acquiring the map operation information from the input operation determination unit 13 and specifying the area (display area) of the map information to be displayed on the touch panel 11. For example, the display area specifying unit 14 specifies the display area that becomes able to be displayed on the touch panel 11 after the map operation is reflected based on the map operation information and the screen size of the touch panel 11 (the size, the resolution and the like of the display area of the touch panel 11). The display area specifying unit 14 outputs display area information indicating the specified display area to the map information display processing unit 15 and the building determination unit 16.

The display area information may be any information that can specify the range of the map information to be displayed on the touch panel 11, and it is information indicating the range of the latitude and the longitude of the map information to be displayed on the touch panel 11, for example. For example, when the shape of the display area of the touch panel 11 is a square, the display area specifying unit 14 may output the information indicating the latitude and the longitude of the map information corresponding to each position of the four corners of the display area as the display area information.

The map information display processing unit 15 is a means of acquiring the display area information from the display area specifying unit 14 and displaying the display area on the touch panel 11. Further, when the input operation determination unit 13 determines an operation as the floor selection operation, the map information display processing unit 15 acquires information indicating the floor number selected by the floor selection operation from the input operation determination unit 13. After that, the map information display processing unit 15 displays the floor map of the building corresponding to the floor selected by the floor selection operation on the touch panel 11 as the map information of the building part for which the floor selection operation is performed.

The building determination unit 16 is a building determination means of acquiring the display area information from the display area specifying unit 14 and determining whether there is a building whose floor map can be displayed (which is hereinafter referred to also as "floor displayable building") within the display area. The building determination unit 16 determines whether there is a floor displayable building in the display area by referring to the building information storage unit 17 in which the building information of each building is prestored, for example. FIG. 4 is a view showing an example of the building information. As shown in FIG. 4, the building information is information in which name of a building, the position of the building (latitude and longitude), the availability of floor display (whether a floor map is displayable or not), floor number information indicating an upper ground floor or a lower ground floor whose floor map exists, a map data number for specifying the floor map are associated with one another.

One example of determination by the building determination unit 16 is described hereinafter. First, the building determination unit 16 refers to the building information of all buildings stored in the building information storage unit 17 and extracts the building information where the latitude and the longitude are included in the display area. Then, the building determination unit 16 determines whether there is a floor displayable building (which is a building where the floor display is "available") among the extracted building information. The building determination unit 16 outputs information indicating the building name corresponding to the floor displayable building in the display area to the floor selection menu display processing unit 18.

Note that, in the determination as to whether a floor displayable building exists or not, it may be determined whether there is a floor displayable building inside the display area and within a predetermined distance from a position on the map corresponding to the touch position. This can exclude a building that is located far from the position on the map corresponding to the touch position, which is the building where a user is less likely to want to refer to its floor map.

The floor selection menu display processing unit 18 is a floor selection menu display processing means of displaying a floor selection menu in close proximity to a touch position when it is determined by the building determination unit 16 that there is a floor displayable building. The proximity of a touch position is a region within a predetermined range from the touch position. The predetermined range may be predetermined by an administrator, for example, to a range where a user can easily operate, or may be freely variable by user setting. The floor selection menu display processing unit 18 includes a menu display position determination unit 18a that determines the display position (reference position and display direction) of the floor selection menu.

The floor selection menu display processing unit 18 associates information indicating a building for which an operation is to be performed (for example, information indicating a building name) with the floor selection menu. Then, when the floor selection operation that selects any selection item in the floor selection menu is done, the operation target information indicating a building for which the floor selection menu is operated and the selection item information indicating the selection item selected by the user are output as the floor selection operation information from the input operation determination unit 13 to the map information display processing unit 15 as described above. Then, the map information display processing unit 15 that has acquired the floor selection operation information switches the map information related to the building that is specified based on the operation target information to the floor map that is specified based on the selection item information, as described in detail later.

The floor selection menu may be used as a common menu for switching the map information related to all floor displayable buildings in the display area, for example. Specifically, the floor selection menu display processing unit 18 may associate, with one floor selection menu, information indicating all buildings that are determined as floor displayable buildings by the building determination unit 16 as information indicating a building for which the operation is performed. Further, the floor selection menu may be only for the floor displayable building that is the closest to the touch position. In this case, the floor selection menu display processing unit 18 associates, with the floor selection menu, only information indicating the floor displayable building at the shortest distance from the touch position. For example, the floor selection menu display processing unit 18 can extract the floor displayable building at the shortest distance from the touch position by referring to information indicating the position (latitude and longitude) of the building contained in the building information stored in the building information storage unit 17.

One example of the way the floor selection menu is displayed is described hereinafter with reference to FIG. 5. The menu display position determination unit 18a determines the first input position A1 as a reference position of a first floor selection menu x1, and determines the direction opposite to the direction from this reference position to the second input position B1 as the display direction of the first floor selection menu x1. Likewise, the menu display position determination unit 18a determines the second input position B1 as a reference position of a second floor selection menu y1, and determines the direction opposite to the direction from this reference position to the first input position A1 as the display direction of the second floor selection menu y1. Hereinafter, the placement and the shape of the floor selection menu are described based on the assumption that a straight line connecting the first input position A1 and the second input position B1 is a line L1, a straight line orthogonal to the line L1 through the touch position A1 is a line L2, and a straight line orthogonal to the line L1 through the touch position B1 is a line L3.

The floor selection menu display processing unit 18 displays the floor selection menus x1 and y1 in close proximity to the touch positions A1 and B1, respectively, based on the display position (reference position and display direction) determined by the menu display position determination unit 18a. To be specific, the floor selection menu x1 occupies a semicircular arch shaped region which is a circular region with a radius of r1 centering on the touch position A1 from which a circular region with a radius of r2 (<r1) centering on the touch position A1 and a region on the touch position B1 side from the line L2 are excluded. Further, the second floor selection menu y1 occupies a semicircular arch shaped region which is a circular region with a radius of r1 centering on the touch position B1 from which a circular region with a radius of r2 (<0) centering on the touch position B1 and a region on the touch position A1 side from the line L3 are excluded.

The floor selection menu display processing unit 18 refers to the floor number information contained in the building information of all floor displayable buildings acquired from the building determination unit 16 and acquires the maximum value (highest floor number) and the minimum value (lowest floor number). Then, the floor selection menu display processing unit 18 displays the selection items corresponding to the displayable floors from the lowest floor to the highest floor, sorting them into the first floor selection menu x1 and the second floor selection menu y1 To be more specific, the floor selection menu display processing unit 18 displays the selection items corresponding to the floors from the reference floor determined based on a predetermined criterion to the highest floor (the floors of the reference floor and higher) as the selection items of the first floor selection menu x1, and displays the selection items corresponding to the floors from the floor just below the reference floor to the lowest floor (the floors of lower than the reference floor) as the selection items of the second floor selection menu y1.

Figure 5:
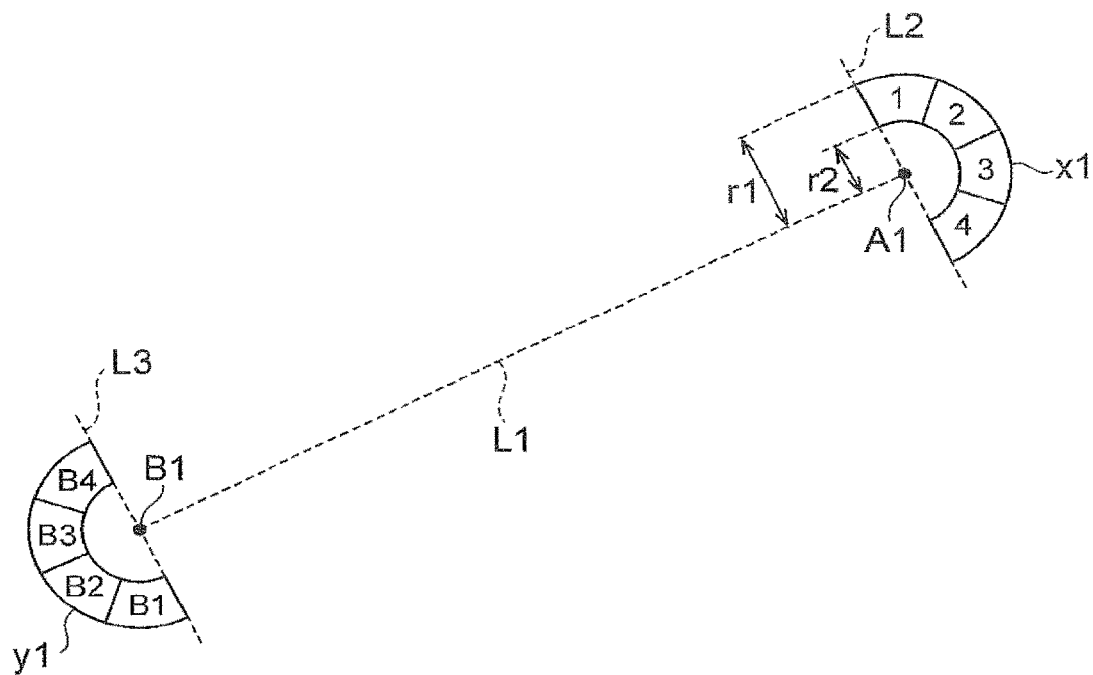
FIG. 5 is a view showing one example of the way of display of a floor selection menu.

FIG. 5 shows a menu display example in the case where the highest floor is the fourth floor and the lowest floor is the fourth basement floor (B4). As one example, the floor selection menu display processing unit 18 sets the first floor as the reference floor, and displays the selection items corresponding to the floors from the first floor to the fourth floor, which are the reference floor and higher, as the selection items of the floor selection menu x1, and displays the selection items corresponding to the floors from the first basement floor (B1) to the fourth basement floor (B4), which are lower than the reference floor, as the selection items of the floor selection menu y1. Note that the way of selecting the reference floor is not limited to the above. The floor selection menu display processing unit 18 may set the floor of the floor map that is currently displayed on the touch panel 11, for example, as the reference floor.

Further, the floor selection menu display processing unit 18 divides each of the floor selection menus x1 and y1 into fan-shaped regions centering on the touch positions A1 and B1, respectively, corresponding to the number of floors to be displayed, and allocates the selection items to the respective fan-shaped regions so that the floor numbers are arranged in ascending or descending order clockwise. Specifically, the floor selection menu display processing unit 18 displays the menus in which the selection items are arranged in the circumferential direction centering on the touch positions A1 and 131, respectively, as the floor selection menus x1 and y1.

Figure 6:
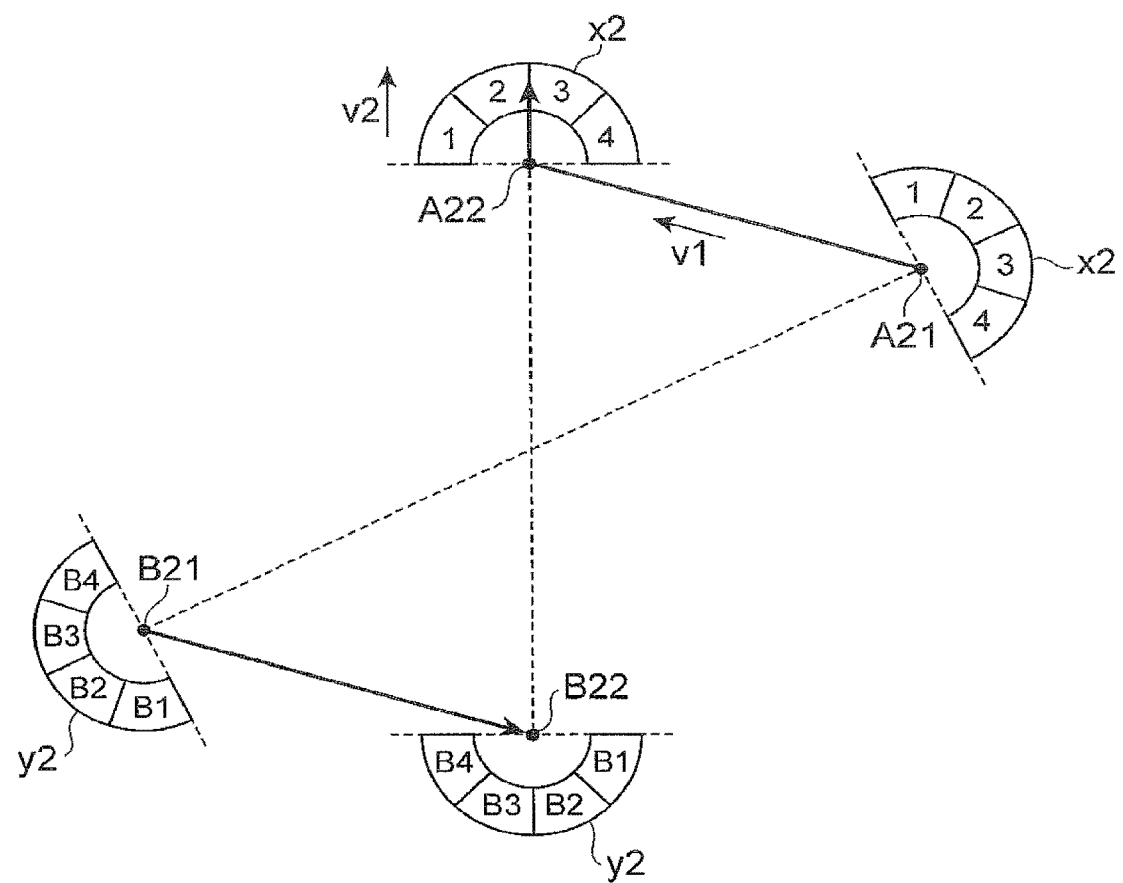
FIG. 6 is a view illustrating one example of a method of determining that a user's touch operation is a floor selection operation.

The processing of each functional block in the case where the input operation determination unit 13 determines that a user's touch operation is the floor selection operation is described hereinafter with reference to FIG. 6. FIG. 6 is a view illustrating one example of a method of determining that a user's touch operation is the floor selection operation.

FIG. 6 shows that a user performs a series of touch operations that first moves (drags) the fingers touching touch positions A21 and B21 to touch positions A22 and B22, respectively, and then moves (drags) the finger touching the touch position A22 toward the floor selection menu x2. In FIG. 6, when the user is touching the touch positions A21 and B21 with the fingers, the floor selection menu display processing unit 18 displays floor selection menus x2 and y2 in close proximity to the touch positions A21 and B21, respectively. After that, when the user's fingers move from the touch positions A21 and B21 to touch positions A22 and B22, the input operation determination unit 13 determines that the touch operation is rotation (map operation) based on the moving amount and the moving direction of the touch positions detected by the touch position detection unit 12. Then, the display area specifying unit 14 specifies the display area based on the moving amount of the rotation, and the map information display processing unit 15 displays the display area on the touch panel 11.

The floor selection menu display processing unit 18 moves the display positions of the floor selection menus x2 and y2 from the proximity of the touch positions A21 and B21 to the proximity of the touch positions A22 and B22 in conjunction with the movement of the touch positions. Such movement of the display positions of the floor selection menus x2 and y2 is achieved as a result of repeatedly performing a series of processing by the touch position detection unit 12, the input operation determination unit 13, the display area specifying unit 14, the building determination unit 16 and the floor selection menu display processing unit 18 at predetermined intervals.

Then, when the user's finger moves from the touch position A22 toward the floor selection menu x2, the input operation determination unit 13 determines whether the moving speed v2 of this movement is larger than the moving speed v1 of the previous touch operation, which is the movement of the user's finger from the touch position A21 to the touch position A22, by a predetermined threshold dv or more. When the input operation determination unit 13 determines that the moving speed v2 is larger than the moving speed v1 by dv or more (when "v2−v1>dv"), it determines that the touch operation where the user's finger moves from the touch position A22 toward the floor selection menu x2 is the floor selection operation. Specifically, when the floor selection menu is displayed on the touch panel 11 and further the touch operation (drag) where the touch position moves toward the floor selection menu at a predetermined speed or more is performed, the input operation determination unit 13 determines that the touch operation is the floor selection operation.

By such determination processing, a user can switch from the map operation to the floor selection operation by performing a drag operation in the direction of the floor selection menu at a relatively higher speed than a normal touch operation regardless of the moving speed of the normal touch operation. Thus, differences among individuals of the user's touch operation are absorbed, and any user can switch the operation with the same feeling of operation. Note that, however, the way of determining the floor selection operation is not limited to the above. For example, the input operation determination unit 13 may determine whether the touch operation is the floor selection operation or not based on whether the moving speed v2 of the touch operation is a predetermined threshold or more regardless of the moving speed v1 of the previous operation.

As described above, when the input operation determination unit 13 determines that the touch operation is the floor selection operation, it outputs the floor number corresponding to the touch position that has moved to the floor selection menu as the selection item information, together with the operation target information indicating the building for the floor selection menu, to the map information display processing unit 15. Then, the map information display processing unit 15 refers to the building information stored in the building information storage unit 17 and acquires a map data number corresponding to the operation target information and the selection item information. After that, the map information display processing unit 15 displays a floor map corresponding to the map data number as the map information of the target building part on the touch panel 11.

The input operation determination unit 13 may determine that the floor selection operation has switched to the map operation based on the fact that the touch position on the floor selection menu has moved to a region other than the floor selection menu in the floor selection operation. Further, the input operation determination unit 13 may determine that the floor selection operation has switched to the map operation based on the fact that the touch position has moved at a higher speed than the previous moving speed of the touch position by a predetermined threshold or more during the period when the floor selection operation is performed.

Further, during the period when the floor selection operation on the first floor selection menu or the second floor selection menu is performed by the movement of the first input position or the second input position, the input operation determination unit 13 may recognize the center of the display position of the floor selection menu where the floor selection operation is performed as one touch position and further determine that the operation of moving the touch position where the floor selection operation is not performed as the map operation. This is specifically described with reference to FIG. 6. Consider the case where a user's finger has moved from the touch position A22 to the floor selection menu x2 and the floor selection operation on the floor selection menu x2 is performed. In this case, the input operation determination unit 13 recognizes the touch position A22 at the center of the display position of the floor selection menu x2 as one touch position and further determines the operation of moving the user's finger on the side where the floor selection operation is not performed from the touch position B22 as the map operation. For example, the input operation determination unit 13 determines the operation of moving the user's finger touching the touch position B22 in the direction getting away from the touch position A22 as zoom-in, and determines the operation of moving the user's finger touching the touch position B22 in the direction getting closer to the touch position A22 as zoom-out.

Figure 7:
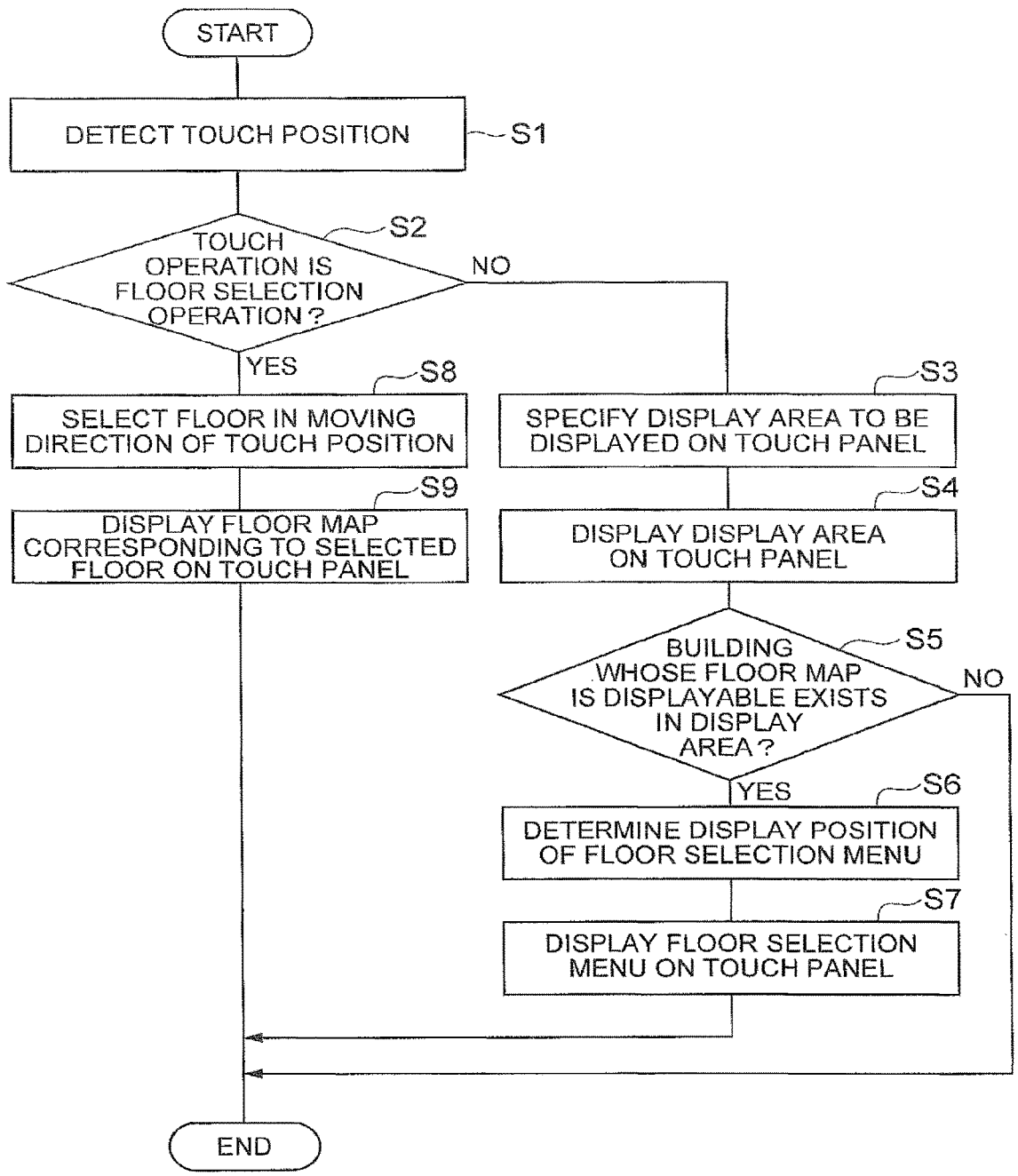
FIG. 7 is a flowchart showing an operation of the map information display device.

The operation of the map information display device 1 including a map information display method according to this embodiment is described hereinafter with reference to FIG. 7. The map information display device 1 performs the processing operations shown in Steps S1 to S9, which are described hereinbelow, repeatedly at predetermined intervals.

First, a touch position on the touch panel 11 is detected by the touch position detection unit 12 (Step S1: input position detection step). Next, it is determined whether a series of touch operations by a user are the map operation or the floor selection operation by the input operation determination unit 13 (Step S2). For example, when the floor selection menu is displayed on the touch panel 11 and further the touch operation (drag) where the touch position moves toward the floor selection menu at a predetermined speed or more is performed, the touch operation is determined as the floor selection operation (Yes in Step S2). The touch operation other than the above is determined as the map operation (No in Step S2).

When it is determined that a series of touch operations by the user are the map operation by the input operation determination unit 13 (No in Step S2), the display area to be displayed on the touch panel 11 is specified by the display area specifying unit 14 that has acquired the map operation information from the input operation determination unit 13 (Step S3). Then, the display area is displayed on the touch panel 11 by the map information display processing unit 15 that has acquired the display area information from the display area specifying unit 14 (Step S4). Further, it is determined whether there is a building whose floor map is displayable (floor displayable building) within the display area by the building determination unit 16 that has acquired the display area information from the display area specifying unit 14 in the same manner (Step S5, building determination step).

When it is determined that there is no floor displayable building in the display area (No in Step S5), one process ends. On the other hand, when it is determined that there is a floor displayable building in the display area (Yes in Step S5), the display position of the floor selection menu for the floor displayable building is determined by the menu display position determination unit 18a (Step S6). To be specific, the display position of the floor selection menu is determined so that the floor selection menu is displayed in close proximity to the touch position. Then, the floor selection menu is displayed on the touch panel 11 by the floor selection menu display processing unit 18 based on the display position determined by the menu display position determination unit 18a (Step S7). The processing in Steps S6 and S7 corresponds to the floor selection menu display processing step in the map information display method according to this embodiment. When the processing of Step S7 is completed, one process ends.

When it is determined that a series of touch operations by the user is the floor selection operation by the input operation determination unit 13 (Yes in Step S2), the floor number (selection item) corresponding to the touch position that has moved to the floor selection menu is output as the selection item information, together with the operation target information, from the input operation determination unit 13 to the map information display processing unit 15 (Step S8). Then, a map data number corresponding to the operation target information and the selection item information is acquired by the map information display processing unit 15 by reference to the building information stored in the building information storage unit 17. After that, a floor map corresponding to the map data number is displayed as the map information of the target building part on the touch panel 11 by the map information display processing unit 15 (Step S9). When the processing of Step S9 is completed, one process ends.

In the above-described map information display device 1, when a building where its floor map can be displayed exists in the map information displayed on the touch panel 11, the floor selection menu is displayed in close proximity to the touch position on the touch panel 11 (cf. the floor selection menus x1 and y1 in FIG. 5 and the floor selection menus x2 and y2 in FIG. 6). It is thereby possible to perform the map operation such as scroll, zoom in/out or rotation of map display and further perform the floor selection operation that selects a floor to be displayed as a map from the floor selection menu smoothly. For example, as shown in FIG. 6, a user can perform the map operation and further perform the floor selection operation easily by slightly moving the finger from the touch position A22 to the floor selection menu x2 or the like. Specifically, a user can seamlessly perform the map operation and the floor selection operation as described above.

Further, in the map information display device 1, all selection items are placed at an equal distance from the touch position A1 or B1 in the floor selection menu x1 or y1 as shown in FIG. 5. A user can thereby select a desired floor with the same operation load when selecting any floor. For example, a user can perform the floor selection operation by moving the finger at the same distance from the touch position A1 or B1 when selecting any floor. It is thus possible to further improve the ease of the floor selection operation.

Further, in the map information display device 1, when the touch positions move from the touch positions A21 and B21 to the touch positions A22 and B22 by the map operation (which is rotation as one example), the floor selection menus x2 and y2 also move in conjunction with the movement of the touch positions as shown in FIG. 6. Thus, the floor selection menus x2 and y2 are always displayed in close proximity to the touch positions. A user can thereby easily perform the floor selection operation even when the touch positions move by the map operation or the like.

Further, because the map information display device 1 includes the input operation determination unit 13 described above, a user can easily switch the map operation and the floor selection operation by changing the moving speed and the moving direction of the touch operation. Specifically, a user can switch from the map operation to the floor selection operation by moving the touch position on the touch panel 11 toward the floor selection menu at a higher speed than the previous operation by a predetermined level or more. Thus, according to the map information display device 1, it is possible to perform the map operation and the floor selection operation seamlessly without need for two steps of touch operations: releasing the finger from the touch panel 11 and then touching a predetermined position on the touch panel 11 again, for example.

Further, in the map information display device 1, because the floor selection menu is displayed at two positions (the floor selection menus x1 and y1) as shown in FIG. 5, for example, a large number of selection items can be displayed at a time. It is thereby possible to improve the ease of the floor selection operation. Further, because the selection items that are displayed in one floor selection menu x1 and the other floor selection menu y1 are clearly distinguished based on a predetermined criterion (for example, whether it is an upper ground floor or a lower ground floor etc.), a user can easily determine which floor selection menu is to be operated in accordance with the floor number which the user desires to display as a map.

Further, in the map information display device 1, the first floor selection menu x1 is displayed on the opposite side to the second input position B1 with respect to the first input position A1, and the second floor selection menu y1 is displayed on the opposite side to the first input position A1 with respect to the second input position B1 by the floor selection menu display processing unit 18 as shown in FIG. 5, for example. Generally, a user touches two positions on the touch panel 11 with the thumb and the forefinger. Specifically, the space between the first input position A1 and the second input position B1 on the touch panel 11 is hidden behind the user's hand and difficult to see. Therefore, according to the map information display device 1, because the floor selection menu is displayed at a position where a user can easily see, it is possible to improve the ease of the floor selection operation.

A map information display program P1 according to one embodiment of the present invention is described hereinafter with reference to FIG. 8. The map information display program P1 is a program for causing a computer with the touch panel 11 to function as the map information display device 1.

Figure 8:
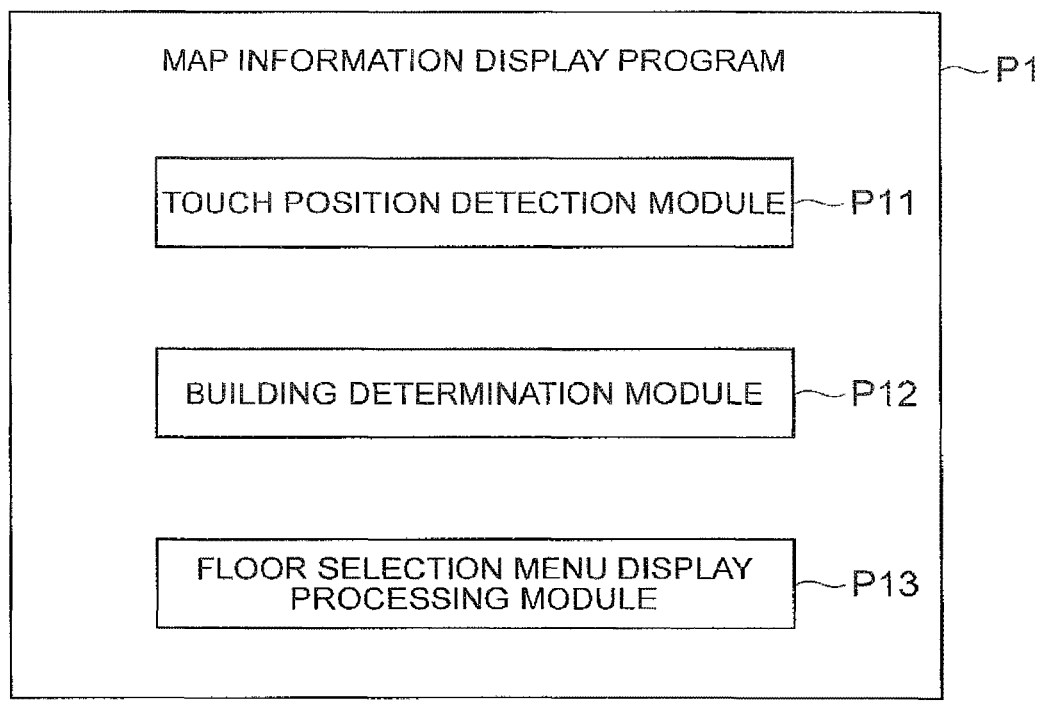
FIG. 8 is a block diagram showing a functional configuration of a map information display program according to one embodiment of the present invention.

FIG. 8 is a block diagram showing a module of the map information display program P1. As shown in FIG. 8, the map information display program P1 includes a touch position detection module P11, a building determination module P12, and a floor selection menu display processing module P13. The functions implemented by executing the touch position detection module P11, the building determination module P12 and the floor selection menu display processing module P13 are respectively the same as the functions of the touch position detection unit 12, the building determination unit 16 and the floor selection menu display processing unit 18 in the map information display device 1 described above.

For example, the map information display program P1 is provided as a data signal superimposed on a carrier wave over a network. In this case, the computer that is used as the map information display device 1 can execute the map information display program P1 by receiving the map information display program P1 through the communication module 104 and storing the received map information display program P1 into the CPU 101 or the RAM 102. The computer thereby functions as the map information display device 1.

Further, the map information display program P1 may be stored in a storage medium such as a micro SD card, for example, and the computer may include a reading unit that reads the storage medium. In this case, when the storage medium is inserted into the reading unit, the computer becomes able to access the map information display program P1 stored in the storage medium through the reading unit. Then, the map information display program P1 runs on the computer, and thereby the computer can operate as the map information display device 1.

[First Alternative Example of Way of Display of Floor Selection Menu]

Figure 9:
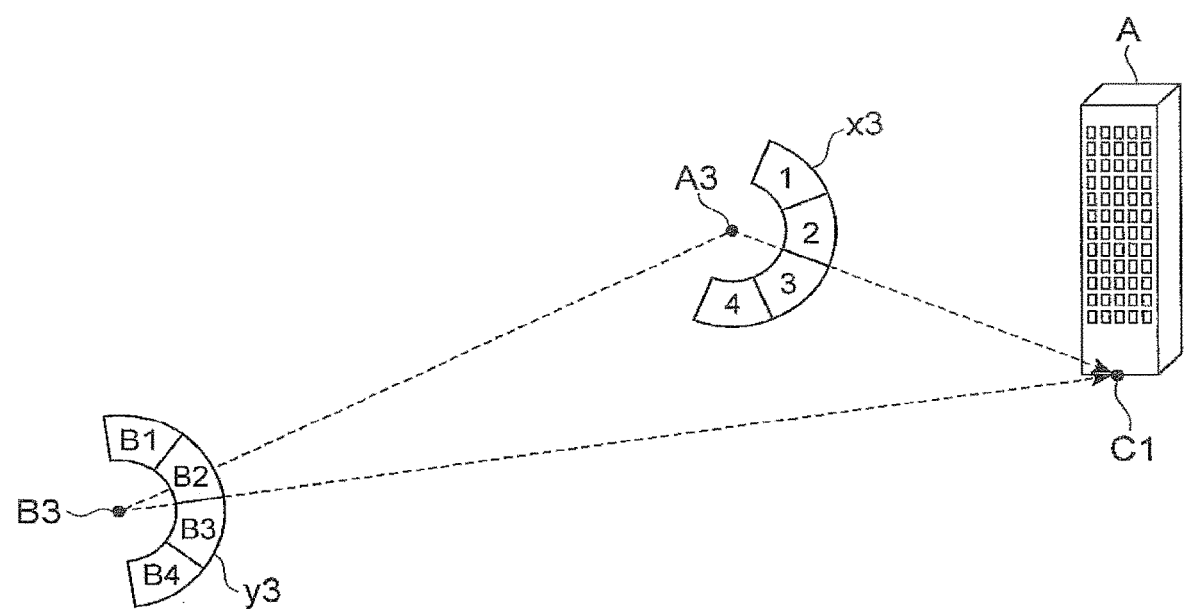
FIG. 9 is a view showing a first alternative example of the way of display of a floor selection menu.

A first alternative example of the way of display of the floor selection menu is described hereinafter with reference to FIG. 9. As shown in FIG. 9, the floor selection menu display processing unit 18 may display floor selection menus x3 and y3 on the side of a floor displayable building (building A) with respect to touch positions A3 and B3, respectively. Note that, in FIG. 9, the building A is shown three-dimensionally for easier understanding.

To be specific, when the building A is determined as a floor displayable building by the building determination unit 16, and information indicating the name of the building A is output to the floor selection menu display processing unit 18, the menu display position determination unit 18a refers to information indicating the position (latitude and longitude) of the building contained in the building information stored in the building information storage unit 17 and thereby grasps the point C1 where the building A exists. Then, the menu display position determination unit 18a determines the touch position A3 as a reference position of the first floor selection menu x3 and determines the direction from the reference position to the point C1 as the display direction of the floor selection menu x3. The floor selection menu display processing unit 18 displays the floor selection menu x3 in close proximity to the touch position A3 based on the reference position and the display direction of the floor selection menu x3 determined by the menu display position determination unit 18a. To be specific, the floor selection menu x3 is displayed so that the apex of the arch part faces the point C1.

The menu display position determination unit 18a determines the touch position B3 as a reference position of the second floor selection menu y3 and further determines the direction from the reference position to the point C1 as the display direction of the floor selection menu y3. The floor selection menu display processing unit 18 displays the floor selection menu y3 in close proximity to the touch position B3 based on the reference position and the display direction of the floor selection menu y3 determined by the menu display position determination unit 18a. To be specific, the floor selection menu y3 is displayed so that the apex of the arch part faces the point C1. The other floor selection menu display processing is the same as the processing of the floor selection menu display processing unit 18 described above and thus not redundantly described.

Note that, in the case where a plurality of buildings are determined as floor displayable buildings by the building determination unit 16, the menu display position determination unit 18a may extract the floor displayable building at the shortest distance from the touch position A3 or the touch position B3 among the floor displayable buildings, and display floor selection menu on the side of the floor displayable building with respect to the touch position A3 or B3. The floor selection menu display processing unit 18 can extract the floor displayable building with the shortest distance from the touch position A3 or the touch position B3 by referring to information indicating the position (latitude and longitude) of the building contained in the building information stored in the building information storage unit 17, for example.

According to the first alternative example, it is possible to visually grasp the position of the building (building A) for which the floor selection menus x3 and y3 are operated by the display positions of the floor selection menus x3 and y3, and it is thereby possible to improve the ease of the floor selection operation.

[Second Alternative Example of Way of Display of Floor Selection Menu]

Figure 10:
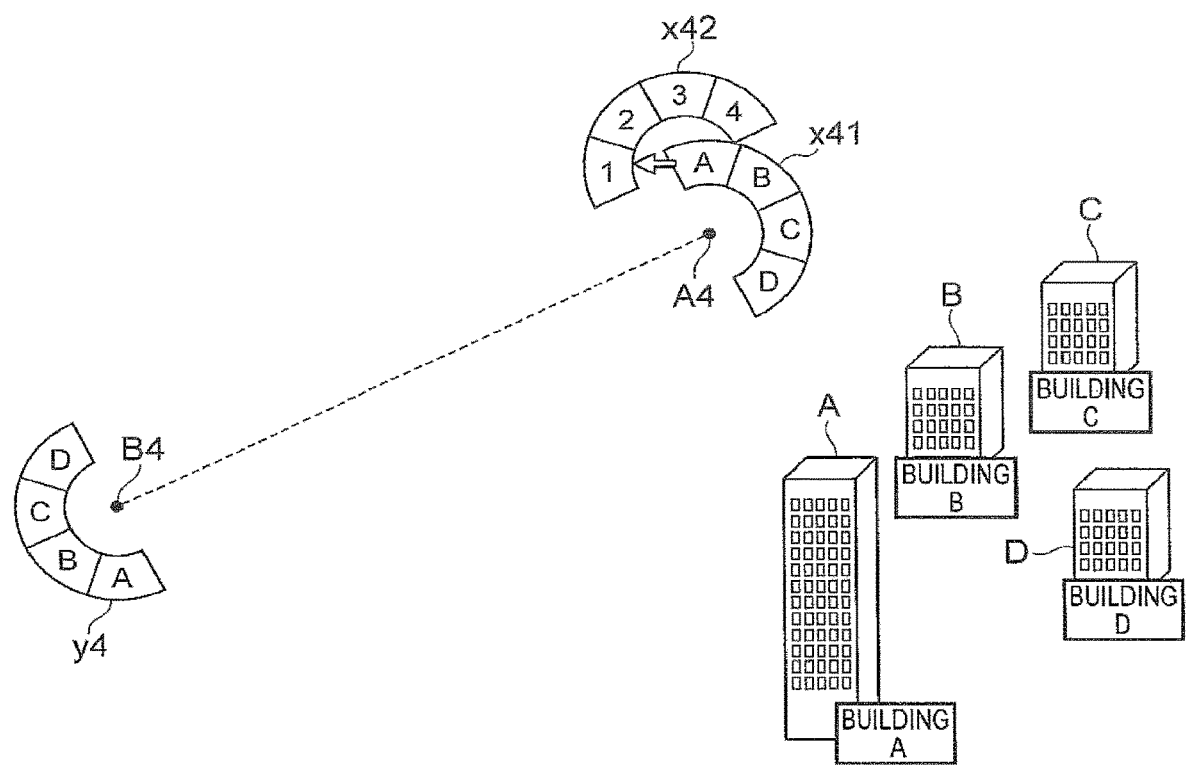
FIG. 10 is a view showing a second alternative example of the way of display of a floor selection menu.

A second alternative example of the way of display of the floor selection menu is described hereinafter with reference to FIG. 10. As shown in FIG. 10, when there are a plurality of floor displayable buildings within the display area, the floor selection menu display processing unit 18 may display floor selection menus corresponding to the respective floor displayable buildings (building A, building B, building C and building D) in stages. Note that, in FIG. 10, the building to the building D are shown three-dimensionally for easier understanding.

To be specific, the floor selection menu display processing unit 18 displays a floor selection menu x41 for selecting an operation target floor displayable building in close proximity to a touch position A4. The floor selection menu display processing unit 18 displays "A" indicating the building A, "B" indicating the building B, "C" indicating the building C and "D" indicating the building D as the selection items of the floor selection menu x41 based on the information indicating the building names corresponding to the floor displayable buildings acquired from the building determination unit 16. When the selection item ("A" in this example) of the floor selection menu x41 is selected by the floor selection operation, the floor selection menu display processing unit 18 refers to the building information storage unit 17 and acquires displayable floor number information for the selected building (building A). Then, based on the floor number information, the floor selection menu display processing unit 18 displays a floor selection menu x42 having the displayable floor numbers as the selection items in close proximity to the display position of the selection item "A" that has been selected in the floor selection menu x41.

For example, when the floor selection operation where the user's finger moves from the position "A" on the floor selection menu x41 to the position "3" on the floor selection menu x42 is performed, the input operation determination unit 13 outputs information indicating the building name corresponding to the selection item "A" and information indicating the floor number corresponding to the selection item "3" to the map information display processing unit 15. Then, the map information display processing unit 15 refers to the building information stored in the building information storage unit 17 and acquires a map data number corresponding to the acquired information indicating the building name and information indicating the floor number. Then, the map information display processing unit 15 displays, on the touch panel 11, a floor map corresponding to the map data number as the map information of the building part corresponding to the information indicating the building name. By this processing, the floor map of the third floor of the building A is displayed on the touch panel 11 as the map information of the part of the building A.

The floor selection menu x42 that is displayed in close proximity to the touch position B4 may have the same structure as the floor selection menu x41. In this case, when the selection items to be displayed on the floor selection menu x42 are selected and the floor displayable building is selected, for example, the floor selection menu display processing unit 18 may display the floor selection menu for selecting the floor number of a lower ground floor that can be displayed for the corresponding floor displayable building.

Further, a framework for displaying the floor selection menus x41 and y42 in stages as described above, which is a framework for displaying the floor selection menu x41 as the floor selection menu of the first stage and displaying the floor selection menu x42 as the floor selection menu of the second stage, is applicable also to the case where there are many displayable floors in one floor displayable building. For example, when floor map information of every floor from the first floor to the twentieth floor can be displayed for the floor displayable building having twenties floors, the above-described framework may be applied by sorting the first to fifth floors to a group A, the sixth to tenth floors to a group B, the eleventh to fifteenth floors to a group C, and the sixteenth to twentieth floors to a group D. To be more specific, the floor selection menu display processing unit 18 may display the floor selection menu with the selection items "A" to "D" as the floor selection menu of the first stage, and display the selection items corresponding to the group selected in the floor selection menu of the first stage as the selection items of the floor selection menu of the second stage. For example, when the selection item "B" is selected in the floor selection menu of the first stage, the floor selection menu display processing unit 18 may display "6" to "10" corresponding to the sixth to tenth floors, as the selection items of the floor selection menu of the second stage.

According to the second alternative example, even when there are a plurality of buildings where a floor map can be displayed (floor displayable buildings), it is possible to display only the floor map of the desired building by operating the floor selection menu corresponding to each building, and it is thereby possible to improve the convenience of a user who refers to the map information. Further, because it is possible to reduce the number of floor selection menus simultaneously displayed on the touch panel 11 and thus reduce a display part of the map information hidden behind the floor selection menu, it is possible to improve the convenience of a user who refers to the map information.

[Third Alternative Example of Way of Display of Floor Selection Menu]

Figure 11:
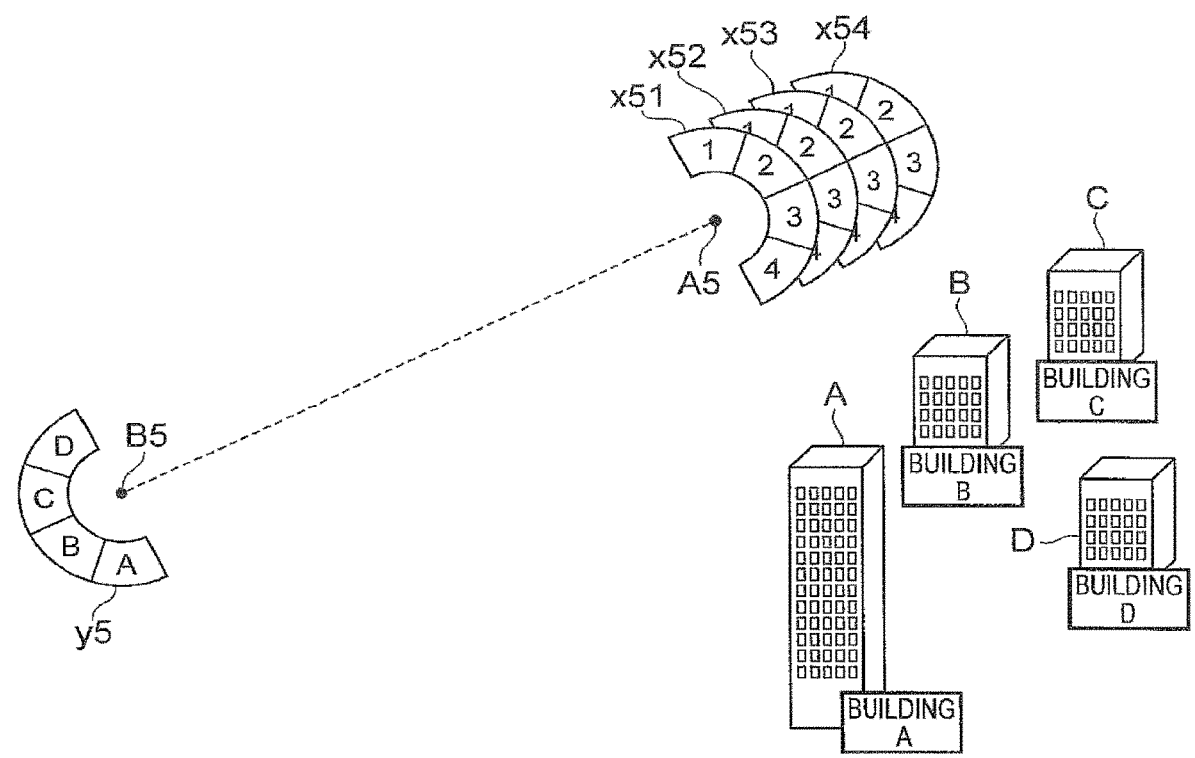
FIG. 11 is a view showing a third alternative example of the way of display of a floor selection menu.

A third alternative example of the way of display of the floor selection menu is described hereinafter with reference to FIG. 11. As shown in FIG. 11, when there are a plurality of floor displayable buildings within the map information displayed on the touch panel 11, the floor selection menu display processing unit 18 may display floor selection menus respectively corresponding to the plurality of floor displayable buildings (building A, building B, building C and building D) simultaneously. Note that, in FIG. 11, the building A to the building D are shown three-dimensionally for easier understanding.

To be specific, the floor selection menu display processing unit 18 displays floor selection menus x51 to x54 corresponding to the buildings A to D, respectively, so that the center positions of the floor selection menus x51 to x54 are located on a straight line connecting touch positions A5 and B5. The floor selection menu display processing unit 18 may display the floor selection menus x51 to x54 sequentially arranged into the floor selection menus x51, x52, x53 and x54 from the closest to the farthest from the touch position A5 so that the adjacent floor selection menus partly overlap. The floor selection menu display processing unit 18 displays the floor selection menu that is closer to the touch position A5 at the front out of the adjacent floor selection menus. The floor selection menu display processing unit 18 may display the floor selection menus using a different color for the edge of each floor selection menu so that which floor displayable building each floor selection menu corresponds to. For example, consider the case where the building name of each floor displayable building or the frame enclosing the building name is displayed using a different color for each building on the touch panel 11. In this case, the floor selection menu display processing unit 18 may set the display color of the edge of a floor selection menu or the like to be the same as the display color of the building name of a floor displayable building corresponding to the floor selection menu or the frame enclosing this building name.

The input operation determination unit 13 determines the touch operation where a user's finger moves from the touch position A5 to the floor selection menu x51 at a predetermined speed or higher as the floor selection operation on the floor selection menu x51. When the user's finger further moves to the floor selection menu x52 to x54 during the floor selection operation, the input operation determination unit 13 may determine the touch operation as the floor selection operation on the floor selection menu x52 to x54. In this case, for better user-friendliness, the floor selection menu display processing unit 18 may display the floor selection menu (the floor selection menu of any one of the floor selection menus x51 to x54) that is determined as being operated by the input operation determination unit 13 at the front.

Further, in combination of the first alternative example, the floor selection menu display processing unit 18 may display the floor selection menu x52 to x54 respectively on the side of the corresponding floor displayable building. Further, although the floor selection menu y5 that is displayed in close proximity to the touch position B5 is the same as that of the above-described second alternative example in FIG. 11, the floor selection menus corresponding to the respective floor displayable buildings may be displayed side by side just like the floor selection menu x51 to x54.

According to the third alternative example, even when there are a plurality of buildings where a floor map can be displayed (floor displayable buildings), it is possible to display only the floor map of the desired building by operating the floor selection menu corresponding to each building, and it is thereby possible to improve the convenience of a user who refers to the map information.

[Fourth Alternative Example of Way of Display of Floor Selection Menu]

Figure 12:
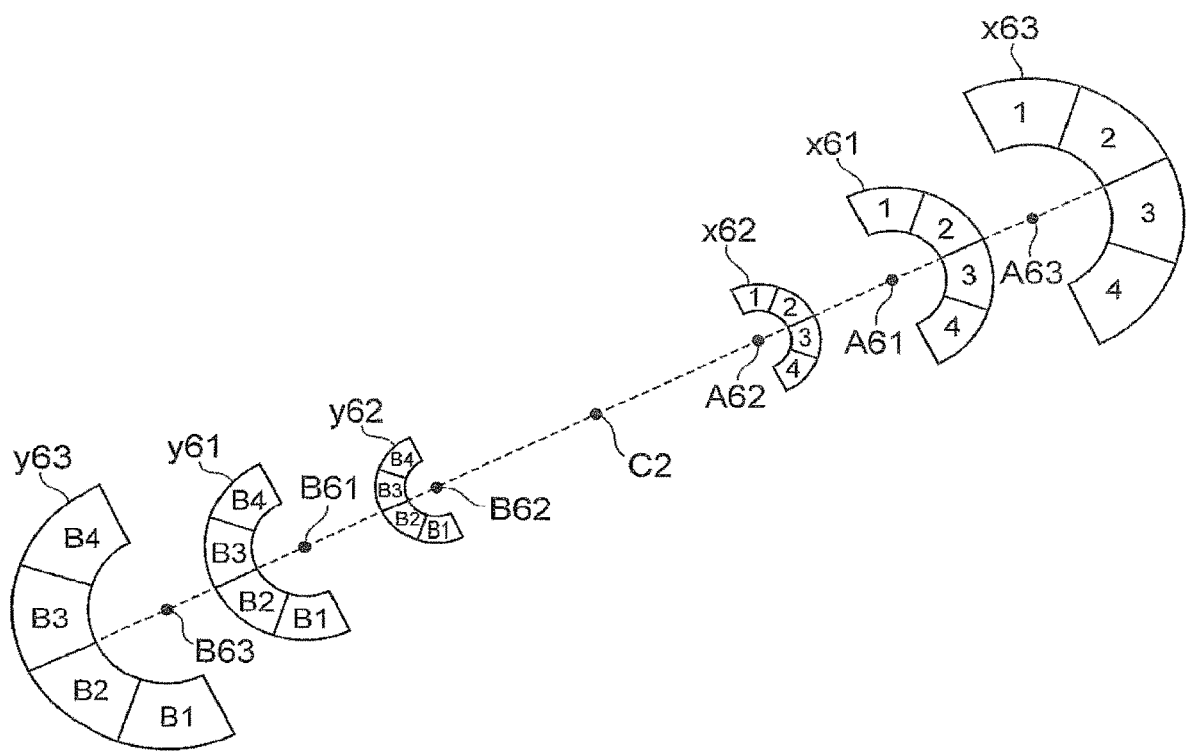
FIG. 12 is a view showing a fourth alternative example of the way of display of a floor selection menu.
Figure 13:
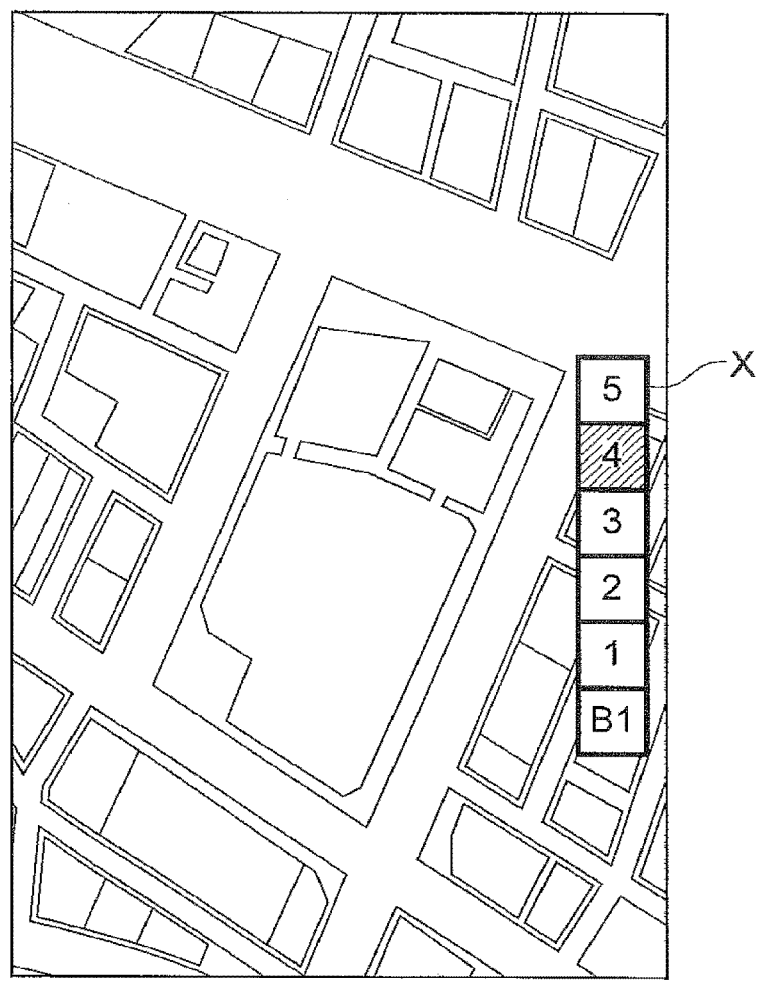
FIG. 13 is a view showing one example of display in a map application according to related art.

A fourth alternative example of the way of display of the floor selection menu is described hereinafter with reference to FIG. 12. As shown in FIG. 12, the floor selection menu display processing unit 18 may increase or decrease the display size of the floor selection menu in conjunction with zoom in or out of the map information displayed on the touch panel 11.

In FIG. 12, it is assumed that user's fingers are touching touch positions A61 and B61 in the initial state. It is also assumed that floor selection menus x61 and y61 are displayed in close proximity to the touch positions A61 and B61, respectively, by the floor selection menu display processing unit 18.

First, consider the case where, from the initial state, the user's fingers touching the touch positions A61 and B61 move toward a midpoint C2 between the touch positions A61 and B61 and reach touch positions A62 and B62. This touch operation is determined as zoom-out by the input operation determination unit 13, and the map information displayed on the touch panel 11 is displayed at a smaller scale by the map information display processing unit 15. In this case, the floor selection menu display processing unit 18 displays floor selection menus x62 and y62 at a smaller scale than the floor selection menus x61 and y61 in the initial state according to the zoom-out rate of the map information displayed on the touch panel 11. Note that, if the floor selection menu is displayed at a too small scale, while it does not interfere with the user referring to the map information, the operation of the floor selection menu becomes difficult. Thus, the floor selection menu display processing unit 18 may previously store the smallest display size of the floor selection menu to prevent the floor selection menu from being displayed at a smaller scale than the smallest display size.

Next, consider the case where, from the initial state, the user's fingers touching the touch positions A61 and B61 move away from the midpoint C2 and reach touch positions A63 and B63. This touch operation is determined as zoom-in by the input operation determination unit 13, and the map information displayed on the touch panel 11 is displayed at a larger scale by the map information display processing unit 15. In this case, the floor selection menu display processing unit 18 displays floor selection menus x63 and y63 at a larger scale than the floor selection menus x61 and y61 in the initial state according to the zoom-in rate of the map information displayed on the touch panel 11. Note that, if the floor selection menu is displayed at a too large scale, while the operation of the floor selection menu becomes easy, it interferes with the user referring to the map information. Thus, the floor selection menu display processing unit 18 may previously store the largest display size of the floor selection menu to prevent the floor selection menu from being displayed at a larger scale than the largest display size.

It is generally assumed that a user desires to refer to the floor map of a building more often when zooming out the map information to refer to large-scale map information than when zooming in the map information to refer to small-scale map information. Therefore, according to the fourth alternative example, when it is likely that the map information is zoomed in and the floor selection operation is performed, the floor selection menu is displayed in a large scale to be more visible, and it is thereby possible to further improve the ease of the floor selection operation (cf. the floor selection menus x63 and y63 in FIG. 12). On the other hand, when it is unlikely that the map information is zoomed out and the floor selection operation is performed, the floor selection menu is displayed in a small scale to be less visible, and it is thereby possible to further improve the convenience of a user referring to the map information (cf. the floor selection menus x62 and y62 in FIG. 12).

An embodiment of the present invention is described in detail above. However, the present invention is not limited to the above-described embodiment. Various changes and modifications may be made to the present invention without departing from the scope of the invention. For example, the way of display of the floor selection menu described in this embodiment and the first to fourth alternative examples may be combined as appropriate.

Further, the case where the input operation is a touch operation, and the input receiving means is the touch panel 11 that can detect a plurality of touch positions is described in this embodiment. However, the input receiving means according to the present invention may be a single-touch panel that detects only one touch position. In this case, while a user cannot perform the map operation on the basis of multi-touch, it is at least possible to perform the operation of moving the map display on the touch panel and the floor selection operation seamlessly.

Further, the input receiving means according to the present invention may be any user interface that receives an operation of specifying an input point (input position) on a display that displays map information, and it is not necessarily assume a touch operation. For example, the input receiving means may have a user interface that recognizes and receives an input position corresponding to a finger or the like that is separated from a display surface. Such an input receiving means is implemented by applying a capacitance system that is used for a touch panel or the like, for example. In this case, a user can perform a gesture operation (hover operation) that moves a finger or the like at a slight distance from a display. In this case also, a user can seamlessly perform the operation of moving map display on a display and the floor selection operation in the input receiving means.

Further, the input receiving means may have a user interface that detects the movement of a user's line of sight detected by a camera function or the like and receives a position on a display corresponding to the user's line of sight as an input position. In this case, a user can perform an input operation (visual operation) by changing the light-of-sight position on the display. In this case also, a user can seamlessly perform the operation of moving map display on a display and the floor selection operation in the input receiving means.

REFERENCE SIGNS LIST

1 . . . map information display device, 11 . . . touch panel (input receiving means), 12 . . . touch position detection unit (input position detection means), 13 . . . input operation determination unit, 14 . . . display area specifying unit, 15 . . . map information display processing unit, 16 . . . building determination unit, 17 . . . building information storage unit, 18 . . . floor selection menu display processing unit, 18a . . . menu display position determination unit, 101 . . . CPU, 102 . . . RAM, 103 . . . ROM, 104 . . . communication module, 105 . . . auxiliary storage device, A1,A21,A22,A3,A4,A5,A61,A62,A63 . . . touch position (first input position), B1,B21,B22,B3,B4,B5,B61,B62, B63 . . . touch position (second input position), P1 . . . map information display program, P11 . . . touch position detection module, P12 . . . building determination module, P13 . . . floor selection menu display processing module, x1,x2,x3,x41,x42,x51,x52,x53,x54,x61,x62,x63 . . . floor selection menu (first floor selection menu), y1,y2,y3,y4,y5, y61,y62,y63 . . . floor selection menu (second floor selection menu)

The invention claimed is:

1. A map information display device comprising:
an input receiving mechanism configured to display map information and receive a user's input operation; and
circuitry configured to
detect an input position for each of a continuous series of user's touch operations on the input receiving mechanism;
determine whether there is a building whose inside information is displayable in the map information displayed on the input receiving mechanism;
display a floor selection menu having selection items corresponding to displayable floors in close proximity to the input position on the input receiving mechanism when it is determined that there is a building whose inside information is displayable; and
determine, when the floor selection menu is displayed, based on a moving speed and a moving direction of the input position detected for each of the continuous series of user's touch operations on the input receiving mechanism, whether the user's touch operation is a map operation that changes the map information displayed on the input receiving mechanism or a floor selection operation that selects a floor from the floor selection menu, such that when the moving speed of the user's touch operation is a predetermined threshold or more in the direction of the floor selection menu, the user's touch operation is determined as a floor selection operation, and otherwise the user's touch operation is determined as a map operation.

2. The map information display device according to claim 1, wherein
the circuitry is configured to display a menu where the selection items are arranged in a circumferential direction centering on the input position as the floor selection menu.

3. The map information display device according to claim 1, wherein
the circuitry is configured to move a display position of the floor selection menu in conjunction with movement of the input position.

4. The map information display device according to claim 1, wherein
the circuitry is configured to display the floor selection menu on a side of the building whose inside information is displayable with respect to the input position.

5. The map information display device according to claim 1, wherein
the circuitry is configured to, when there are a plurality of buildings whose inside information is displayable in the map information displayed on the input receiving mechanism, display the floor selection menu corresponding to each of the plurality of buildings.

6. The map information display device according to claim 1, wherein
the circuitry is configured to increase or decrease a display size of the floor selection menu in conjunction with zoom in or out of the map information displayed on the input receiving mechanism.

7. The map information display device according to claim 1, wherein
the circuitry is configured to:
detect a first input position and a second input position as the input position;
display a first floor selection menu in close proximity to the first input position;
display a second floor selection menu in close proximity to the second input position;
display selection items corresponding to floors of equal to or higher than a reference floor determined based on a predetermined criterion as selection items of the first floor selection menu; and
display selection items corresponding to floors of lower than the reference floor as selection items of the second floor selection menu.

8. The map information display device according to claim 7, wherein
the circuitry is configured to display the first floor selection menu on an opposite side to the second input position with respect to the first input position and display the second floor selection menu on an opposite side to the first input position with respect to the second input position.

9. The map information display device according to claim 1, wherein
the circuitry is configured to:
detect a first input position and a second input position as the input position;
display a first floor selection menu in close proximity to the first input position;
display a second floor selection menu in close proximity to the second input position;
recognize, during a period when the floor selection operation on the first floor selection menu or the second floor selection menu is performed by movement of the first input position or the second input position, a center of a display position of the floor selection menu where the floor selection operation is performed as one input position; and
determine that an operation of moving the input position where the floor selection operation is not performed as the map operation.

10. A map information display method comprising:
an input position detection step of detecting an input position for each of a continuous series of user's touch operations on an input receiving mechanism;
a building determination step of determining whether there is a building whose inside information is displayable in map information displayed on the input receiving mechanism;
a floor selection menu display processing step of displaying a floor selection menu having selection items corresponding to displayable floors in close proximity to the input position on the input receiving mechanism when it is determined in the building determination step that there is a building whose inside information is displayable; and
a determining step of determining, when the floor selection is displayed, based on a moving speed and a moving direction of the input position detected for each of the continuous series of user's touch operations on the input receiving mechanism, whether the user's touch operation is a map operation that changes the map information displayed on the input receiving mechanism or a floor selection operation that selects a floor from the floor selection menu, such that when the moving speed of the user's touch operation is a predetermined threshold or more in the direction of the floor selection menu, the user's touch operation is determined as a floor selection operation, and otherwise the user's touch operation is determined as a map operation.

11. A non-transitory storage medium that stores a map information display program causing a computer with an input receiving mechanism configured to display map information and receive a user's input operation to:
detect an input position for each of a continuous series of user's touch operations on the input receiving mechanism;
determine whether there is a building whose inside information is displayable in the map information displayed on the input receiving mechanism;
display a floor selection menu having selection items corresponding to displayable floors in close proximity to the input position on the input receiving mechanism when it is determined that there is a building whose inside information is displayable; and
determine, when the floor selection is displayed, based on a moving speed and a moving direction of the input position detected for each of the continuous series of user's touch operations on the input receiving mechanism, whether the user's touch operation is a map operation that changes the map information displayed on the input receiving mechanism or a floor selection operation that selects a floor from the floor selection menu, such that when the moving speed of the user's touch operation is a predetermined threshold or more in the direction of the floor selection menu, the user's touch operation is determined as a floor selection operation, and otherwise the user's touch operation is determined as a map operation.

* * * * *